US008299386B2

(12) United States Patent
Reisenthel

(10) Patent No.: US 8,299,386 B2
(45) Date of Patent: Oct. 30, 2012

(54) DEVICE DESIGNED TO CUT OFF THE SPENT WIRE ON A SPARK EROSION MACHINE

(75) Inventor: Jean-Pierre Reisenthel, Contamine Sarzin (FR)

(73) Assignees: AGIE SA, Losone (CH); Charmilles Technologies S.A., Meyrin (CH)

( * ) Notice: Subject to any disclaimer, the term of this patent is extended or adjusted under 35 U.S.C. 154(b) by 752 days.

(21) Appl. No.: 12/393,548

(22) Filed: Feb. 26, 2009

(65) Prior Publication Data

US 2009/0230091 A1 Sep. 17, 2009

(30) Foreign Application Priority Data

Mar. 13, 2008 (CH) .......................... 366/08

(51) Int. Cl.
 *B23K 9/00* (2006.01)
(52) U.S. Cl. .................................. 219/69.11; 219/69.12
(58) Field of Classification Search ..... 219/69.11–69.12, 219/69.15, 69.17, 73, 76.14, 121.64, 121.14, 219/137, 136, 137.71, 130.01, 216; 399/30, 399/27, 333, 308, 237, 302, 307; 83/23, 83/53, 177, 364, 367, 411
See application file for complete search history.

(56) References Cited

U.S. PATENT DOCUMENTS

| | | | | |
|---|---|---|---|---|
| 4,422,918 A | * | 12/1983 | Inoue | 204/206 |
| 4,878,866 A | * | 11/1989 | Mori et al. | 445/36 |
| 5,045,662 A | * | 9/1991 | Yamada | 219/69.12 |
| 5,523,538 A | | 6/1996 | Matsuda | |
| 2003/0057187 A1 | * | 3/2003 | Baiardi et al. | 219/69.12 |

FOREIGN PATENT DOCUMENTS

| | | |
|---|---|---|
| EP | 1634668 | 3/2006 |
| JP | 61293727 | 12/1986 |
| JP | 4193422 | 7/1992 |

* cited by examiner

*Primary Examiner* — Quang T Van
*Assistant Examiner* — Phuong Nguyen
(74) *Attorney, Agent, or Firm* — Bachman & LaPointe, P.C.

(57) ABSTRACT

Cutting device for spark-erosion machine wires in which, after passing through a machining region, the wire-electrode is cut up into sections which are disposed of as waste products into a recovery receptacle. The device comprises electrical contacts connected to a voltage/current source. The wire is subjected to a dielectric fluid whose flow rate is sufficiently high to generate a turbulent flow regime and cause random lateral movements of the wire which sporadically brushes against the contacts.

11 Claims, 3 Drawing Sheets

DEVICE DESIGNED TO CUT OFF THE SPENT WIRE ON A SPARK EROSION MACHINE

BACKGROUND OF THE INVENTION

Spark-erosion machines, using a wire as electrode for cutting out an electrically-conducting part, are now in widespread use. The wires commonly used are formed from alloys of copper, zinc, steel, etc. and have diameters from 0.1 to 0.3 mm. The supply of new wire is stored on a reel that can contain several km of wire. The wire is unwound from the reel at speeds that can go from a few cm/s to 50 cm/s. It is guided into the machining area where it is subjected to a process that renders it unsuitable for further use: the wire is only used for machining once. In the case of some machines using spark erosion by wire, the same wire is re-used several times for machining; however, the present invention does not relate to these types of machines. In the framework of the present invention, the wire having passed through the machining region becomes a waste product and must therefore be conditioned in order to enable its recycling. One of the known means consists in cutting it up using any given cutting tool into segments of a few centimeters in order to limit its build-up and in order to be able to transport the residues into a receptacle of limited volume.

Numerous devices have been used in order to cut up the spent wire. The majority of them comprise mobile mechanical parts comprising cutting edges subject to wear. These parts, often made of special and costly materials, need to be replaced periodically. It should be added that the cutting devices produce repeated shocks which can make the wire vibrate in the machining region. They require relatively complex, costly and delicate mechanical assemblies to be developed and maintained. The present invention provides a more economical, simpler and more reliable solution.

The Patent text JP 61293727 describes a device for cutting up spent wire using an electrical current which causes the wire to melt. The wire is held under traction between two pulleys that pinch the wire. One of these two pulleys is made from an insulating material, the other comprises conducting sectors at its periphery. The current flows in the wire at regular intervals between the conducting sectors and a fixed contact disposed upstream. The latter does not provide a reliable contact with the wire. Another drawback is that the mechanical device is relatively complex; it comprises several moving parts subject to wear. Furthermore, the system makes continuous use of the fuse effect which causes the whole device to heat up.

In the Patent text JP 4193422 the principle is found of melting the wire by induction using a coil inside which the wire runs without making any contact. A high-frequency AC current, supplied by a power source, flows in the coil intermittently. The drawback of such a solution is that the high-frequency source is a relatively costly element since it has to also allow intense eddy currents to be induced in wires of very small diameter.

The patent text U.S. Pat. No. 5,523,538 mentions an element found in certain embodiments of the present invention. This is a long tube designed to carry the spent wire away from the machining region; an intense stream of compressed air is injected into this tube upstream in such a manner as to propel the wire. At the exit of the tube, the wire is recovered by a cutting device that chops it up into small segments. Here, there is an excessive complexity of the mechanisms and the drawback of the cutting tools which must be periodically replaced.

The Patent text EP 1634668 describes a wire cutting up system intended for a high-end machine. Special precautions are taken here to ensure that the cutting device does not interfere with the normal unwinding of the wire in the machining region. FIGS. 7a and 7b show a variant in which, at the exit of its disposal channel, the wire is deviated by a stream of compressed air, delivered by a nozzle 25, which propels it towards the blades 15,16. This example shows that it is necessary to provide alternative low-cost solutions for entry-level machines, which is achieved by the present invention.

SUMMARY OF THE INVENTION

In a preferred embodiment, the present invention uses a tube, more generally a narrow channel of given length, in order to remove the spent wire from the machining area. The advance of the wire within this channel is ensured by an intense stream of compressed air, of high-pressure water coming from the machining region for example, or generally of any dielectric fluid propelled at a sufficiently high speed inside the said conduit. The invention takes advantage of the properties of the flow of the fluid within the said channel. It is well known that, at low flow rates, the various layers composing the fluid slide relative to one another without mixing within the channel. The flow is said to be laminar.

Beyond a certain flow rate, instabilities appear in the advance of the various layers of the liquid. Phenomena caused by friction interfere with the flow. The various groups of particles forming the fluid no longer move in a regular manner parallel to the walls of the channel. Lateral movements occur in a random fashion. The chaos that occurs within the fluid is categorized under the term "turbulent flow".

According to Reynolds, the velocity V is known beyond which the turbulent regime occurs, according to the formula: $V>3000 \cdot \eta/\rho \cdot D$ in which V is the average mean velocity of the fluid in the channel, $\eta$ the dynamic viscosity of the fluid, $\mu$ its density and D the diameter of the channel.

The advance of the wire, propelled by the fluid surrounding it in this turbulent flow, undergoes the same random lateral movements as the fluid itself. The wire advances in an erratic manner coming into contact with the sides of the channel. It suffices to place at least one electrical contact inside the said channel, or in the vicinity of the exit orifice of the said channel, for the wire to occasionally acquire the same potential as the said contact. A current can flow in the wire if at least one other contact has been placed inside or outside of the channel, and if a source is connected between the two contacts.

The flow of this current may be simply used in order to detect the presence of the wire in a particular region of the disposal channel. However, the phenomenon described hereinabove may also be advantageously used for cutting up the wire, since the wire may be caused to break for two reasons: the 'fuse effect' caused by the electric current heating the wire and/or the erosive effect of an electrical discharge able to be initiated between the wire and one of the contacts.

A simple experiment demonstrates that the fuse effect is favoured by using a voltage source of less than 20 Volts. When the fuse effect dominates, the segments of wire can reach excessive lengths, which is detrimental to a uniform distribution of the waste products in the recovery receptacle. The temperature of the wire has to rise for it to melt. In order to achieve this, the two electrical contacts must be well established for a long enough time. The turbulent flow of the liquid is not guaranteed to establish the good contact required to melt the wire. In such an environment, the contact is predominantly established in a transient manner, which explains the presence of excessively long segments of wire in the recovery receptacle.

The erosive effect is promoted by increasing the voltage of the source beyond 50 Volts. The transient contacts are sufficient to cause discharges which are accompanied by a sharp crack in the air. The wire is cut up into segments of varying length depending on its removal speed and the distance between the two contacts. The length of the segments obtained is not constant but obeys a random distribution law. Far from being a drawback, this phenomenon allows, on the contrary, a more uniform distribution of the waste product inside the recovery reservoir.

However, in continuous operation, the erosive effect is accompanied by a noisy spattering that can cause discomfort and problems for persons who need to work nearby. The device should therefore be enclosed in a sound-proof box.

Furthermore, the use of a source voltage higher than 20 Volts will require precautions of use to be taken with the aim of protecting the personnel from the danger of electrocution. This danger is increased if one or other of the contacts is disposed outside of the transport conduit for the wire. For this reason, it is preferable to install all the contacts inside the conduit made of insulating material.

In the course of long duration tests, the appearance of metal oxide deposits is observed in the vicinity of and on the contacts. It is therefore preferable to use materials to which metal oxides do not adhere so as to be able to carry out periodic cleaning by means of a small brush. In particular, with regard to the contact material, experience has shown that the use of hard graphite or copper-graphite is preferable to metal such as, for example, copper or brass.

The invention will be explained hereinafter with the aid of exemplary embodiments and of the following figures.

DETAILED DESCRIPTION

Figure 1:
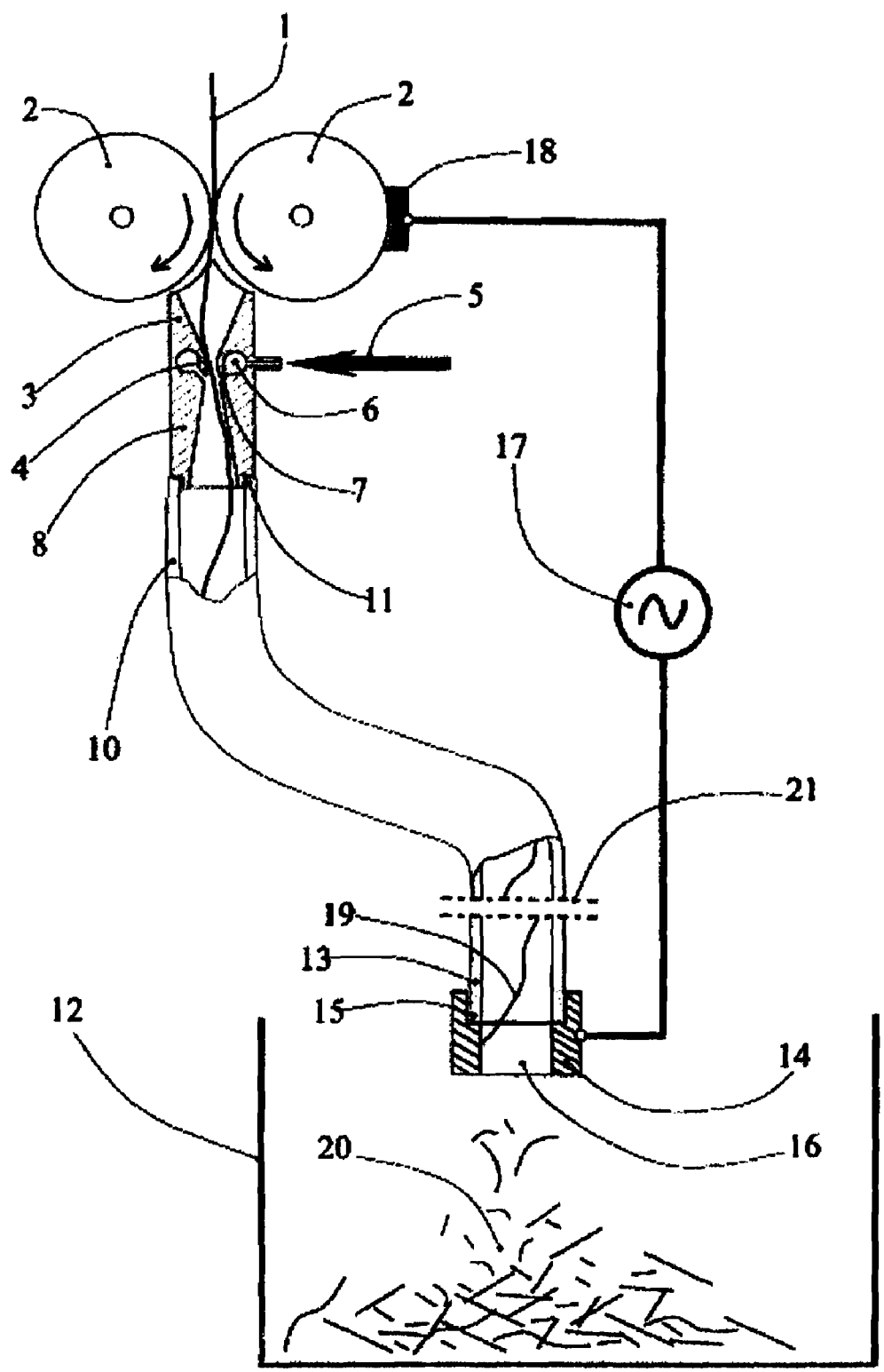
FIG. 1 is a schematic diagram of a device for removal of the spent wire from its exit from the machining region as far as a waste recovery receptacle, according to a first embodiment of the invention.

FIG. 1 presents an example of a first embodiment of the invention. The spent wire 1 coming from the machining region is captured between two rotating metal cylinders 2 which pinch the wire and drive it downwards. At the exit of the cylinders 2, the wire is immediately channelled by a component 3 in the form of a funnel profiled into the shape of a whistle where it is introduced between the cylinders 2. At the base of the funnel 3, the wire passes through a constriction 4 at the exit of which it is subjected to a powerful stream of compressed air directed downwards. The stream of compressed air is supplied by an external pipe 5 schematically shown by an arrow. The flow of air is distributed around the wire by an annular conduit 6 which comes out into a series of injectors 7. The latter inject the compressed air into the narrow upper part of a second funnel 8 open towards the bottom. The wire advances downwards under the effect of the air flow and enters into a flexible pipe made of insulating material 10 connected in a leaktight manner 11 to the funnel 8. The component represented in FIG. 1 by the elements indexed 3, 4, 6, 7 and 8 only forms one exemplary embodiment of a device allowing a high-pressure fluid to be injected into a conduit designed to transport the wire. The flexible pipe 10 is of any given length depending on the desired location of the recovery receptacle 12. The end 13 of the pipe 10 is equipped with a metal nipple 14 adjusted to the pipe in a leaktight manner 15 and comprising an outlet 16 whose inside diameter is equal to the inside diameter of the pipe 13 in the present example, in such a manner as not to comprise any irregularities liable to catch the wire. In another variant embodiment, a nipple 14 can be designed with a narrower inside diameter and an internal profile with no irregularities with the aim of increasing the probability of contact with the wire. The metal nipple 14 is electrically connected to one of the poles of a voltage source 17 whose other pole is connected to a brush contact 18, made of copper-graphite, which rubs against one of the rotating cylinders 2 designed to drive the wire upstream of the device. The voltage source 17 is capable of delivering a current high enough to melt the wire or a high enough voltage to initiate an electrical discharge between the wire and the nipple 14. This can be a simple power-regulated AC source galvanically isolated with respect to the electrical network. The wire 19 having arrived at the outlet of the disposal pipe 13 is subjected to the eddies and vortices in the fluid escaping through the outlet 16. The flow rate of the high-pressure fluid must be maintained at a sufficiently high value so that the flow adopts a turbulent regime when it passes through the nipple 14. If however the flow rate of the fluid in the disposal channel 13 were not high enough, an auxiliary fluid injection nozzle could be disposed downstream or in the neighbourhood of the outlet 16 so as to guarantee a sufficient agitation, on the model in FIG. 7a of the document EP1634668. The agitation of the fluid causes erratic lateral movements of the wire 19 which comes sporadically into contact with the walls of the metal nipple 14. An electric current then flows in the segment of wire included between the drive cylinders 2 and the exit nipple 14, which could be used to indicate that the wire has not become stuck inside the pipe 13.

As already mentioned, owing to the electric current, the wire may break for two reasons. The fuse effect can make it melt at any given location during its transport starting from the pinch point between the two cylinders 2 up to the exit nipple 14. The erosive effect of the spark produced at the nipple 14 may also be sufficient to cut through the wire. These phenomena occur in a random fashion, and the wire is cut up into segments of variable length. The strands of wire 20 pile up in the recovery receptacle 12.

Figure 2:
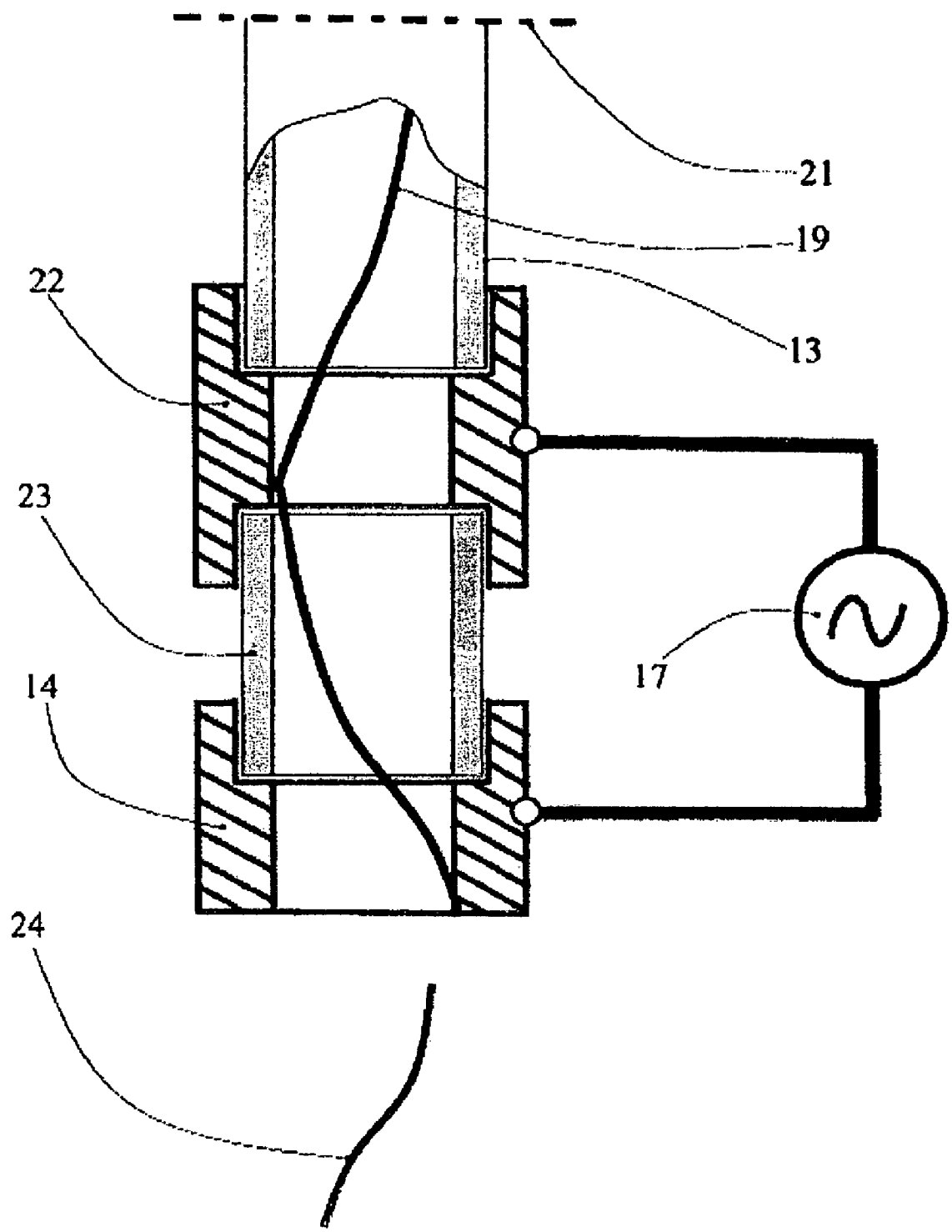
FIG. 2 is a detailed diagram of a device for electrically chopping the wire placed at the outlet of a tube for disposing of the spent wire, according to a second embodiment of the invention.

A second embodiment of the invention is shown schematically in FIG. 2. The previous embodiment comprises drawbacks that it can be desirable to avoid. The metal drive cylinders 2 are used both for transmitting the current that will cut the wire and also for transmitting the machining current. There is a risk of interfering with the latter essential function. Accordingly, in a second embodiment, another electrical contact is provided, removed from the machining region, for carrying the current designed to break the wire. Furthermore, the disposal pipe for the wire 10, 13 can be very long, depending on the embodiment. As a result, the probability of seeing segments of wire appearing that are excessively long, hence more difficult to store in the recovery receptacle 12, increases.

FIG. 2 shows a detail from FIG. 1, but improved. The improvement is located at the end of the pipe 13 used for the transport and disposal of the wire, shown in FIG. 1 underneath the broken line 21. In FIG. 2, the same exit nipple 14 is shown that is used to eject the wire towards the recovery receptacle. However, in FIG. 2, the electrical connection between the current source 17 and the drive cylinders 2 is eliminated. The improvement consists in introducing an electrically conducting sleeve 22 upstream of the exit nipple 14. This sleeve 22 is for example a metal tube element similar to the exit nipple 14 so as to be able to be inserted between two insulating pipes and to be adjusted in a leaktight fashion with them both. More precisely, the said intermediate sleeve 22 is connected upstream to the end 13 of the wire transport tube and downstream to the other insulating pipe element 23, itself connected to the exit nipple 14. The source 17, in this case, is connected on one side to the intermediate sleeve 22 and, on the other, to the exit nipple 14. In the previous embodiment, the wire was permanently connected to one of the poles of the source 17, the other pole being sporadically connected to the wire. In the present embodiment, each of the two poles of the source 17 is connected sporadically to the wire by means of the intermediate sleeve 22, on the one hand, and by the exit nipple 14, on the other.

The erratic agitation of the fluid causes lateral movements of the wire 19 which comes into contact with the walls of either the intermediate sleeve 22 or of the metal nipple 14. When these two contacts occur simultaneously, an electric current flows in the segment of wire included between the intermediate sleeve 22 and the exit nipple 14. Despite the absence of a continuous connection to the source 17, it is observed that the probability of simultaneous contacts is very high.

The establishment of a sufficiently turbulent flow regime inside this conduit element so as to achieve the desired effect is easy to obtain. This can typically be obtained in three ways: i) by increasing the fluid injection pressure at 5; ii) by shrinking the conduit downstream of the end of the transport tube 13; iii) by introducing irregularities into the geometry of the flow channel downstream of the end of the transport tube 13. As may be expected, the wire is cut up into sections 24 which become shorter as the distance between the intermediate sleeve 22 and the exit nipple 14 becomes shorter.

The wire chopping device thus formed comprises no moving parts. The fact that this device is purely static offers certain advantages as regards its simplicity and robustness.

In order to further increase the probability of simultaneous contacts, the arrangement of the three components indexed 22, 23 and 14 described hereinabove can, of course, be repeated. In this way, a succession of mutually isolated metal tubes will be obtained at the exit of the transport tube 13, the tubes of even order being connected to one of the poles of the source 17 and the tubes of odd order being connected to the other pole of the source 17.

Figure 3:
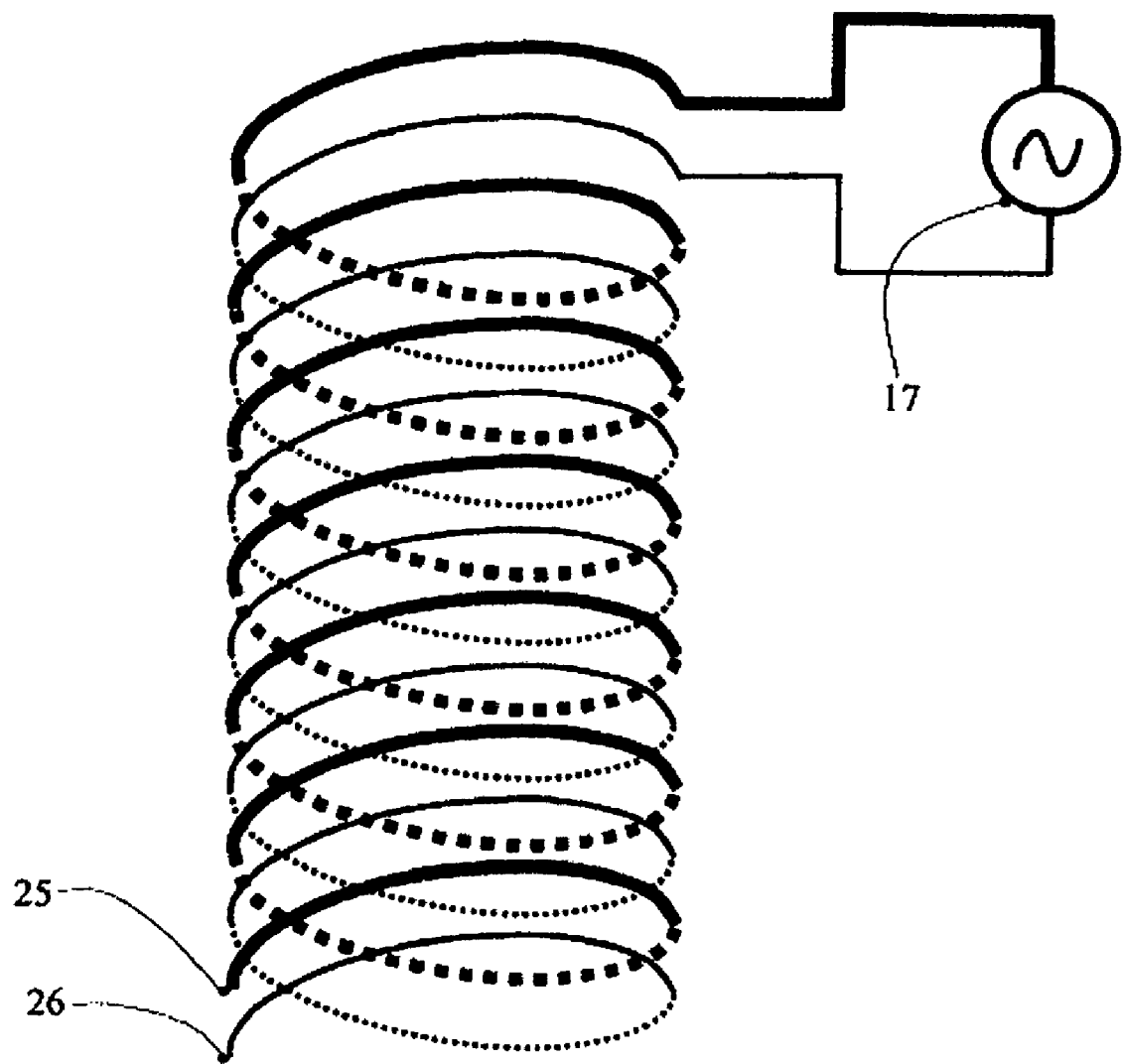
FIG. 3 shows a variant of the device in FIG. 2 designed to increase the probability of contact between the wire and the two poles of the current/voltage source. In this last diagram, for the sake of clarity, neither the spent wire nor the outlet of the disposal tube is shown.

FIG. 3 symbolizes a third embodiment of the invention. It was seen in the previous embodiment that, in order to increase the probability of simultaneous contacts, the wire can be made to pass inside a device comprising a succession of mutually isolated metal tubes and forming a succession of channelling elements. The segments of cut up wire will be shorter the closer are the said metal tubes to one another.

The device in FIG. 3 allows the probability of simultaneous contacts to be further increased and the length of the segments of wire to be reduced. The diagram shows two electrically conducting cables 25, 26 lap wound in a double helix around an imaginary cylinder (not shown). The two cables 25, 26 are isolated from one another, but are not isolated with respect to a wire channelled inside of the said imaginary cylinder. The two cables 25, 26 should be seen as fixed against the internal surface of an insulating tube (not shown), the latter being used to channel the high-pressure fluid and the wire to be cut up. The two cables 25 and 26 are each connected a pole of the current/voltage source 17. The probability of simultaneous connections of the wire to be cut up with one or other of the poles of the source is greater the more tightly wound the double helix and the higher the number of turns.

In order to generalize the principle of this $3^{rd}$ embodiment, a channelling element may be considered within which a dielectric fluid is flowing under a turbulent regime. This fluid propels a flexible metal wire passing inside a channelling element. The latter comprises, in its internal part, a large number of pairs of electrical contacts electrically isolated from one another and configured in such a manner as to be able to transmit their voltages to the wire simply by brushing against it without hindering its advance. One (or more) current/voltage source(s) is (are) connected to one (or more) pair(s) of contacts so as to make an electric current flow in the wire. The wire is able to simultaneously brush against the two contacts forming the (a) pair. The probability of brush contact increases with the number of pairs of contacts present inside the said conduit and connected to the two poles of the (a) current/voltage source.

The transport of the spent wire from the machining region towards the recovery receptacle is preferably carried out according to the description hereinabove by means of a conduit, or tubular channelling elements. This solution to the problem is of course not exclusive. Similar devices are known that use two drive belts between which the wire runs. In this case, it is easy to conceive of a device according to the invention implementing a channelling element placed downstream of the belts, for example.

The invention claimed is:

1. Cutting device for spark-erosion machines in which, after passing through a machining region, the wire-electrode is cut up into sections which are disposed of as waste products, the device comprising,
   means for transporting the spent wire from a machining region towards a recovery receptacle,
   at least one electrical contact connected to one pole of a voltage/current source,
   wherein the wire is subjected to a dielectric fluid whose flow rate is sufficiently high to generate a turbulent flow regime and that the wire sporadically brushes against the at least one electrical contact by reason of random lateral movements of the dielectric fluid and acquires the potential of the contact, whereby the spent wire is cut up into sections, owing to electric current and the sections are of variable length and are disposed of as waste products are disposed of as waste products.

2. Device according to claim 1, wherein another pole of the current/voltage source is connected to a contact situated downstream of the machining region.

3. Device according to claim 1, wherein another pole of the current/voltage source is connected to a contact situated downstream of the device for transporting the spent wire.

4. Device according to claim 1, wherein the wire is propelled inside a channelling element by the dielectric fluid flowing in the turbulent regime and an electrical contact is placed at an exit orifice of the channelling element.

5. Device according to claim 1, wherein the wire is propelled inside a channelling element by the dielectric fluid flowing in the turbulent regime and an electrical contact is placed inside the channelling element.

6. Device according to claim 1, further comprising at least one pair of mutually isolated electrical contacts each connected to one of opposing poles of a voltage/current source, the said contacts being placed inside a channelling element in which the wire is propelled by the dielectric fluid in the turbulent flow regime.

7. Device according to claim 6, further comprising a succession of channelling elements each containing a pair of mutually isolated electrical contacts each connected to one of the opposing poles of a voltage/current source.

8. Device according to claim 7, further including several voltage/current sources.

9. Device according to claim 6, further comprising a pair of electrical contacts in the form of two conductors lap wound in a double helix, the two conductors each being connected to one pole of a current/voltage source.

10. Device according to claim 1, wherein the electrical contacts are composed of graphite or copper-graphite.

11. Device according to claim 1, wherein the device detects the presence of the wire in a particular region of transport.

\* \* \* \* \*